March 26, 1935.  E. PIQUEREZ  1,995,578
APPARATUS FOR TESTING THE BRAKES OF A MOTOR VEHICLE
Filed Aug. 7, 1930   4 Sheets-Sheet 3
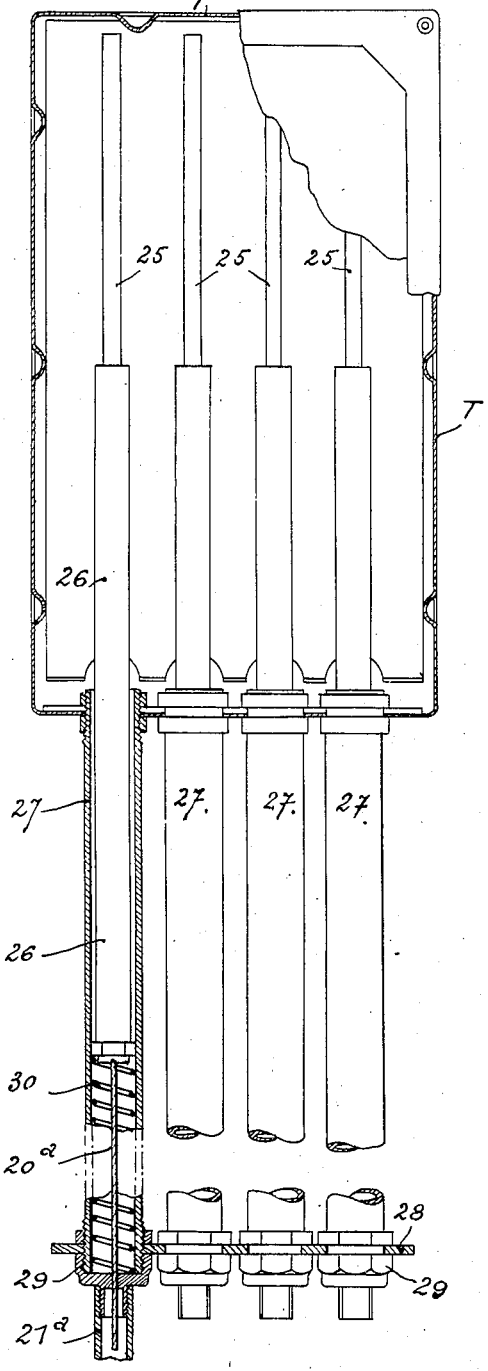
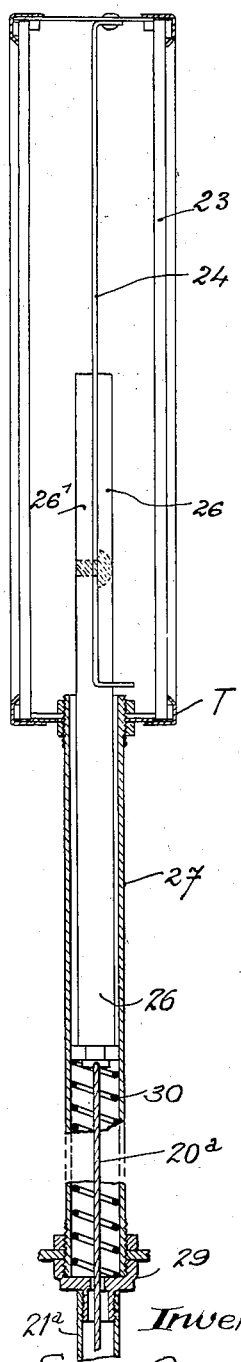

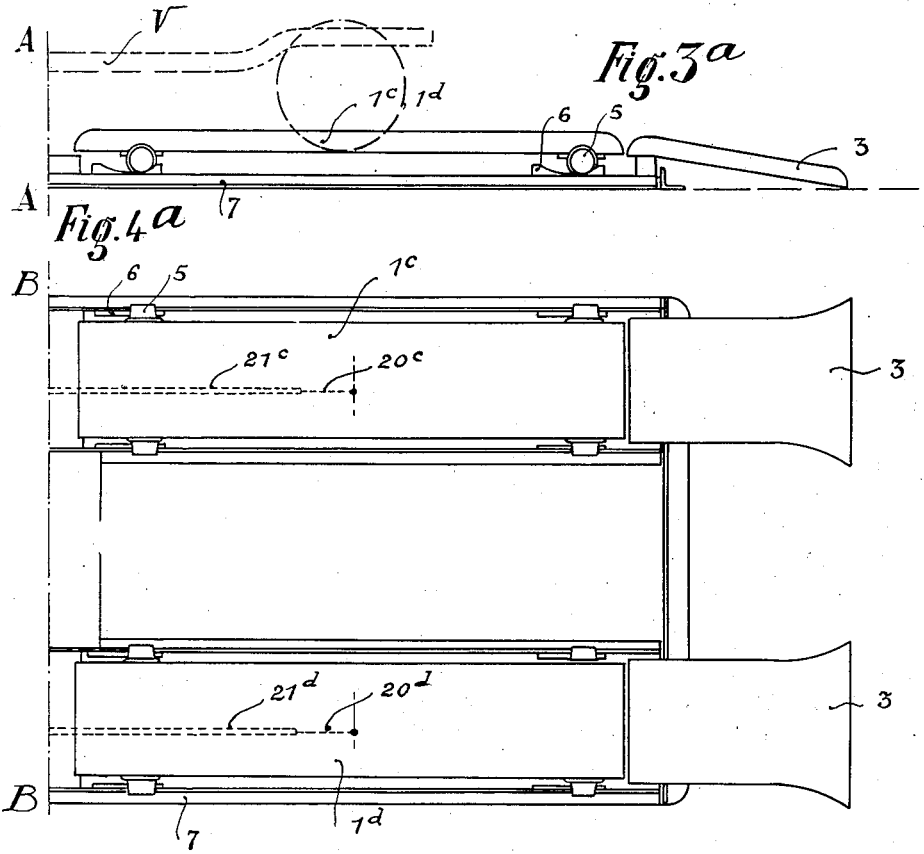
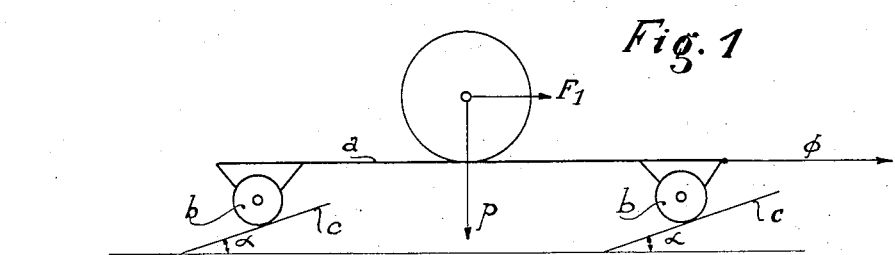

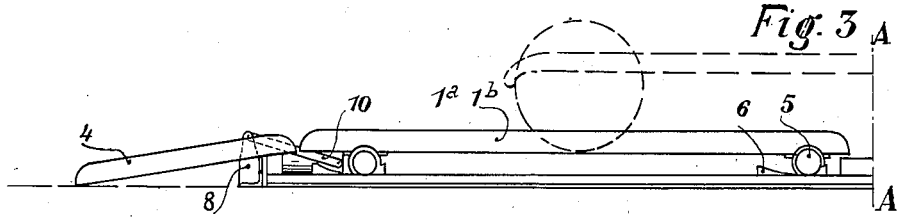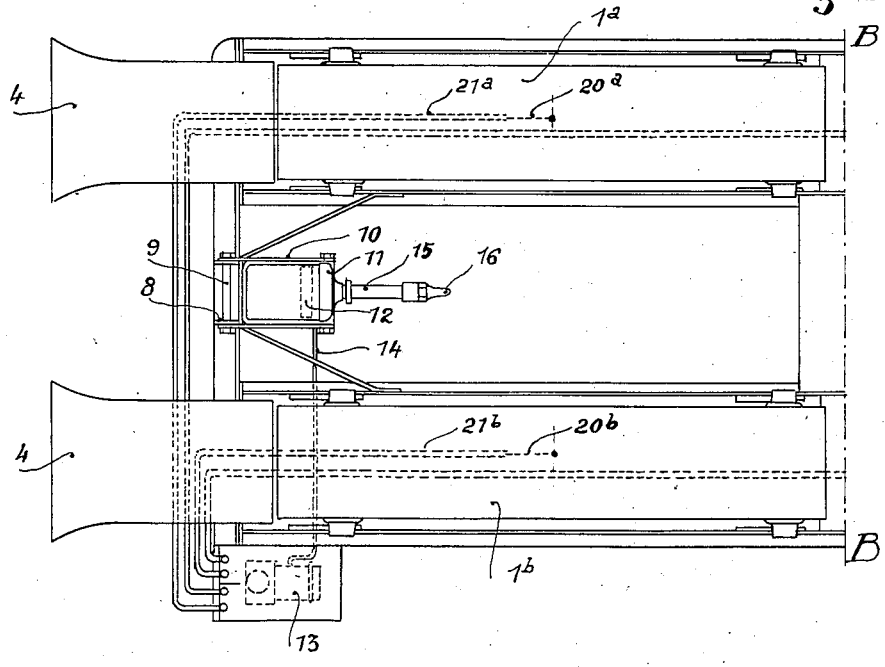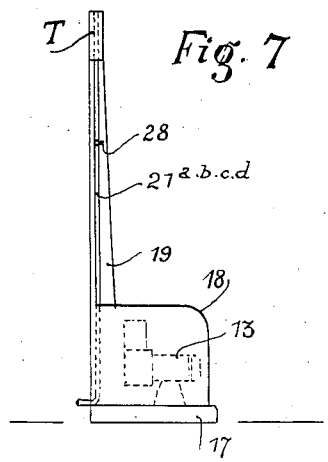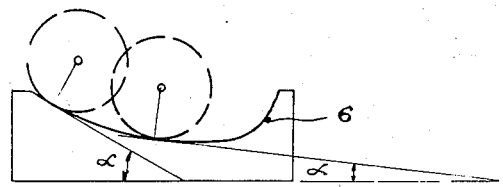

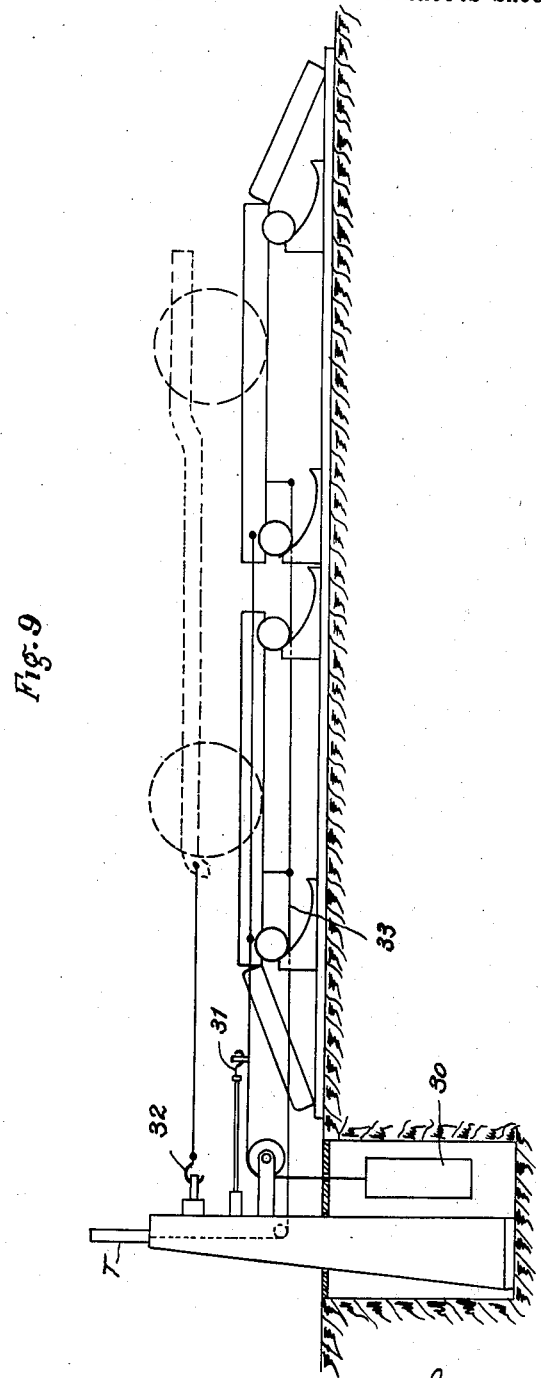

UNITED STATES PATENT OFFICE 1,995,578

APPARATUS FOR TESTING THE BRAKES OF A MOTOR VEHICLE

Emile Piquerez, Paris, France

Application August 7, 1930, Serial No. 473,670
In France December 13, 1929

10 Claims. (Cl. 73—51)

My invention relates to an apparatus used for testing the brakes of motor vehicles. It is of the greatest importance for safety to determine the efficiency of the brakes of a motor vehicle. This efficiency is appreciated by measuring the value of the torque C necessary to be applied to the wheel in order to rotate it when the brake is applied in certain conditions. If R indicates the spoke of the wheel considered rigid, F the force at the rim, the torque $C=RF$ it will be sufficient to measure said force F (which will be called the braking force) in order to appreciate the efficiency of the brake. In effect considering a wheel loaded with a total weight $p$, the highest value that the force F may acquire when the frictional coefficient of the wheel upon the ground is $f$, will be $Fm=fp$, Fm designating the maximum of force F, beyond this value the wheel begins to skid and the braking is no longer efficient. Consequently it will be sufficient in practice to determine for a given value of the stress upon the driving element of the brake the fraction of charge K that the force $F_0$ must reach at the wheel rim: $F_0=Kp$. When the amount $F_1$ of the force to be applied to the rim of each one of the wheels in order to rotate it is then measured in predetermined conditions of action upon the driving element, it will only be necessary in order to obtain the optimum braking effect to adjust the brakes in such a manner that the value of $F_1$ be equal to that of $F_0$ which it was aimed to reach.

Various apparatus have already been proposed to obtain said result but in all of them it is necessary to first determine the value of $p$ in order to deduct the optimum braking power $F_0$.

The apparatus according to the present invention does away with this previous valuation as it allows of directly measuring the braking fraction $K_1$ for every wheel on the vehicle. The adjustment of the brakes then consists in bringing said value $K_1$ measured by the apparatus to the optimum value K which it is proposed to reach.

Considering a horizontal platform $a$ (Fig. 1) supported by means of four rollers $b$ upon two inclined rectilinear rails $c$ forming with the horizontal an angle $\alpha$, $\phi$ will designate the horizontal force to be exerted upon the platform to maintain it in equilibrium.

The force $\phi$ may be decomposed in four parts $\phi^1, \phi^2, \ldots \phi^4$ applied to each one of the rollers, the weight $\pi$ of the platform being similarly decomposed in four charges upon each roller $\omega_1, \omega_2, \ldots \omega_4$. The equation of equilibrium of any one of the rollers (Fig. 2) no account being taken of the friction will be: $\phi=\omega \tan \alpha$. The three vectors extending from the origin into the second and third quadrants represent, (1) the downward force caused by the weight of a vehicle wheel ($\omega$); (2) the force parallel to the inclined plane tending to cause a movement down the said plane; and (3) the force equal and opposite to the horizontal force necessary to prevent the wheel from moving down the inclined plane ($\phi$). As the angle opposite this vector having its sides perpendicular to the sides of the angle $\alpha$ is equal to the angle $\alpha$, the equation $\phi=\omega \tan \alpha$ may be derived. The whole platform will be in equilibrium, if $\phi=\Sigma \phi=\Sigma \omega \tan \alpha=\pi \tan \alpha$. In other words, the horizontally directed force necessary to move the weight of one roller $w$ up an incline of the grade represented by the angle $\alpha$ will be, the weight of the roller ($w$) times, the length of the grade divided by the rise for a given length, ($\tan \alpha$).

Supposing now that the platform is loaded with a wheel $d$ to be tested which is suitably braked upon its axle and that $p$ indicates the weight upon said wheel. When a horizontal stress $F_1$ is applied to the wheel axle, supposing it to be smaller than the adherence force of the wheel rim to the platform, said force will be transmitted to the platform and keep it balanced upon the slope if: $F_1=(\pi+p) \tan \alpha$.

Consequently it will only be necessary to modify the angle $\alpha$ for $F_1$ to acquire the value $F_0$ of the optimum braking power at the instant when the wheel begins to rotate around its axle. $F_0=Kp$ being the value imposed for $F_0$, if this value is carried in the equation of equilibrium there will be found:

$$Kp=(\pi+p) \tan \alpha$$

whence:

$$K=\tan \alpha + \frac{\pi}{p} \tan \alpha$$

Now in normal testing circumstances, tan of the angle of the incline has a value included between 0.4 and 0.6 and the ratio $$\frac{\pi}{p}$$

may vary from 0.10 to 0.15, the second term therefore indicates a rectification of from 10 to 15% of the value of the first term, this showing in practice an error inferior to the testing errors; the first term gives therefore a very satisfying approximation of the calculated value of the efficiency coefficient K.

Consequently according to my invention the vehicle to be tested is placed upon four identical carriages a tractive power is exerted upon said vehicle and the value of the angle α at which each wheel begins to rotate notwithstanding the braking is determined.

In order to automatically produce this value the rolling path of every roller has a curvilinear shape the tangent of which slopes more and more as the roller moves forwards. As soon as the value of the coefficient of efficiency is attained the carriage stops and this is indicated by a suitably arranged index, which may be located at any desired point and is connected to the carriage by any suitable driving gear. All indexes are assembled upon a single board thus allowing to note at once which wheel begins to rotate owing to inadequate braking, the corresponding index remaining stationary and the others moving on. The board is preferably graduated in values of the coefficient of efficiency of the brakes.

The apparatus may also be arranged in such a manner that the vehicle is kept stationary and the tractive power is exerted upon the lower part of the apparatus that is to say upon the frame which will then be provided with means allowing it to move without friction.

Lastly, in order to allow of eliminating the correcting term $$\frac{\pi}{p} \tan \alpha$$

in the expression of K, the carriage may be balanced by counterweights or the like capable of returning them to the inoperative position at the top of their curvilinear path. In that case the carriages being first locked and the vehicle to which the brakes have been applied being made completely stationary, the measuring operation will be automatically started by the unlocking of the carriages, the reading taking place when they stop.

Figs. 3 to 8 of the appended drawings show by way of example a mode of construction of an apparatus for testing the brakes of a motor vehicle according to my invention.

Figs. 3 and 3a are partial longitudinal views of same the post which carries the indicating board being omitted.

Figs. 4 and 4a are partial plan views of same.

Figs. 5 and 6 are respectively a front elevation and a side view of the indicating board.

Fig. 7 is a side view of the aforesaid post.

Fig. 8 is a diagram showing a certain number of values of the angle α, according to the stopping points of a roller upon its curvilinear rolling path.

Fig. 9 is a diagrammatic side view of a modified embodiment of the invention in which the automobile is held stationary during the test.

As will be seen in the drawings the apparatus comprises four carriages $1^a$, $1^b$, $1^c$, $1^d$ having an appropriate surface capable of producing an adhesion equal at least to that of the average dry road-bed, which are placed in such a manner as to be capable of supporting the four wheels of the vehicle, the latter having access to the carriages by the inclined planes 3 at the rear and coming out in the same direction upon the inclined planes 4 at the front. The carriages are each provided with four rollers 5 moving upon curvilinear rolling paths 6 gradually rising towards the front. Said paths are constituted for example by brackets secured upon the longitudinal section iron bearers 7 resting upon the ground.

At the front and in the middle of said frame are placed two small brackets 8 symmetrically to the axis carrying a transverse bar 9 which constitutes the front pivot for two connecting rods 10. The latter being connected on the other hand at the back with a cylinder 11 which constitutes the driving means for the apparatus. A piston 12 contained within said cylinder is moved in same by air pressure from a small compressor 13 connected with said cylinder by means of a pipe 14. The rod 15 of piston 12 terminates outside the cylinder in a hook 16 to which the vehicle V whose brakes are to be tested is connected by any appropriate means.

The compressor 13 is supported upon a foundation plate 17 placed at the front and on the sides of the apparatus it is covered over by a casing 18. Said plate 17 carries a post 19 at the top of which is placed an indicating board T.

Flexible cables $20^a$, $20^b$, $20^c$, $20^d$ extend from the carriages $1^a$, $1^b$, $1^c$, $1^d$ pass through tubes $21^a$, $21^b$, $21^c$, $21^d$, and end at the indicating board T shown in detail in Figs. 5 and 6.

The board T is constituted by a box provided at the front with a glass 23 and inside with a sheet metal partition 24 having four vertical slots 25. In each of the latter is guided the stem $26^1$, of rectangular section of a semi-cylindrical index 26, which passes through the bottom of the box and is slidable in a tube 27. The ends of the cables $20^a$, $20^b$, $20^c$, $20^d$ are connected with the various indicators 26. The guides 27 are locked upon a small plate 28 by means of nuts and caps 29 the latter comprising screwthreaded sockets upon which screw the ends of the rigid tubular sheaths $21^a$, $21^b$, $21^c$, $21^d$, for the various cables. Springs 30 which are compressed when the carriages are not in operation are placed inside the guiding parts 27 and under the plunger-indexes, the indexes are then in their lowermost position. A fourfold graduation inscibed upon the glass of the board in parallel with the indexes indicates the values of the coefficient of efficiency of the brakes for each wheel. It may be designed in function of the tangents of the angles α formed by the tangents at the various points of the bends 6 to the horizontal as shown in Fig. 8.

The mode of operation is as follows:

The vehicle being supported upon the four carriages or platforms is connected by its fore axle to the hook 16 of the tractive piston. The compressor being started the driver operates the foot lever of the brake so as to cause it to move to a predetermined position. This operation may be effected by any suitable mechanical device such for example as a screw jack. By reason of the adhesion of the wheels upon the carriages the latter start forward. This forward movement loosens the cables 20 and the indicators 26 are drawn consequently upwards by the springs 30. When one of the four wheels begins to rotate it will be ascertained by noting that the corresponding index remains stationary on the indicating board. It will then be sufficient to act upon the regulation of said wheel in order to make the braking efficient thus preventing the subsequent unlevelling of the three remaining carriages relatively to the one which is stationary from producing a difference in the distribution of the weight among the four wheels and consequently causing a mistake in the reading.

It will be noted that it is possible to give to the brakes of the same axle a coefficient of efficiency different from that given to those of the other axle. Thus for example if the back wheels begin to rotate, the carriages remaining stationary, and the front carriages move further, the longitudinal inclination of the carriage will still be very slight and will not modify the distribution of the weight between the two axles.

Consequently my apparatus allows of strictly insuring the same braking efficiency to both the wheels of the same axle while giving a predetermined preponderance of operation relatively to the other axle.

A slight braking preponderance is generally allowed to the front axle. When the four carriages stop the values of the coefficients of efficiency for both axles will be readable on the board T. When these values are not satisfactory the four brakes will be regulated in such a manner that the desired K values correspond to the new positions of stoppage.

It is understood that the construction of the apparatus which has been described and illustrated is by no means limitative that for example the construction of the board T may vary and that similar indicating devices may be substituted to the indexes. It will also be evident that the cables 20 may be mounted in such a manner as to pull upon the indexes, the springs 30 being in that case unbent when the indexes are at rest.

It will also be understood that the apparatus may be arranged so as to allow of the vehicle being locked in position. The tractive force would then be applied to the lower part of the apparatus that is to the whole of the rails 6 and of the longitudinal bearers 7 which in that case would be suitably arranged so as to move without friction relatively to the ground.

The apparatus may also be devised in such a manner that the carriages are normally returned by any suitable system of counterweights or springs 30 to the highest point of the rolling inclined path and may be locked in this position by connection 31 to a stationary part of the apparatus 32. The vehicle would thus be brought upon the carriages and suitably retained in position by connecting it for example to a stationary part 32 of the apparatus. The brakes being then applied to the desired extent it will only be necessary to simultaneously free the four carriages in order to allow them of running down their inclined paths causing the rotation of the wheels up to the moment when equilibrium is obtained between the braking stress and the horizontal component of the power which tends to return the carriages at the bottom of their rolling paths. At the instant when the equilibrium obtains the above indicated equations are realized and the value of the tangent of the angle $\alpha$ made by the curve with the horizontal at the stopping point of the carriage determines as in the previous instance the value of the braking coefficient. The positions of stopping of each of the carriages are registered on the board T, the indicators of which are connected with the carriages by cables 33.

This method has the advantage of eliminating through the balancing of the weight of the carriages the correcting term $$\frac{\pi}{p} \tan \alpha$$

of the fundamental equation of the apparatus.

Lastly, it will be observed that according to the first method herein described the coefficient of efficiency K which has been measured corresponds to the friction coefficient at rest between the parts and the brake drums. On the contrary in the second method the measured coefficient corresponds to the friction coefficient when driving since at first the wheels rotate and stop at the moment when the equilibrium obtains.

The apparatus may be constructed without any difficulty so as to allow of testing the brakes by either method this being useful in the case of very accurate measures.

What I claim and desire to secure by Letters Patent of the United States is:

1. Apparatus for testing the brakes of a vehicle by determining the value of the ratio between the brake force at the rim of the wheel and the weight supported by the wheel, comprising a movable support for each wheel, a base having an inclined curvilinear path for each support, means for exerting a tractive force on the braked wheel and means for measuring the tangent of the angle formed between the horizontal and a line drawn tangentially to the curvilinear path of the base, at the point of contact of the support with the said base when said support is in equilibrium with the said tractive force.

2. Apparatus for testing the brakes of a motor vehicle comprising bases having inclined curvilinear paths, carriages for supporting the wheels of the vehicle on said paths, means for pulling the braked vehicle and means for measuring the tangent of the angle formed between the horizontal and a line drawn tangentially to the point of contact of a carriage on the curvilinear path of the base, when the carriage moving on this base is in equilibrium with the tractive force exerted on the braked wheel and of the weight of said wheel.

3. Apparatus for testing the brakes of a motor vehicle, comprising inclined curvilinear surfaces, carriages for supporting the vehicle wheels and resting on said inclined surfaces, counterweights for bringing said carriages to the top of said surfaces, releasable means for fastening them in this position, means for preventing horizontal movement of said vehicle upon release of said carriages and means for measuring the tangent of the angle formed between the horizontal and a line drawn tangentially to the curvilinear surface at the point of contact between the carriage and the surface when the carriages have come to rest.

4. An apparatus for testing the wheel brakes of a motor vehicle comprising, a movable carriage for each wheel, a surface on each carriage having a coefficient of friction with the vehicle wheel at least equal to that of the average road-bed, rollers on said carriages, said rollers being in contact with stationary, inclined, curvilinear surfaces, means for applying a continuous tractive force to the braked vehicle mounted on the carriages, and means to indicate the position of the rollers on said curvilinear surfaces.

5. An apparatus for determining the value of the ratio of the brake force at the rim of a vehicle wheel and the weight supported by said wheel comprising four carriages placed in line by pairs, each having a surface with a coefficient of friction with the vehicle wheel at least equal to that of the average road-bed, said carriages supporting the four wheels of a motor vehicle, two inclined surfaces connected to said carriages for guiding the vehicle wheels onto the carriages, and two inclined surfaces for guiding the vehicle from the carriages, rollers on said carriages, said rollers resting on stationary inclined curvilinear surfaces, a cylinder provided with a piston, movable under air pressure, means for connecting said vehicle to said piston, and means to indicate the movements of said carriages upon movement of said piston.

6. Apparatus for testing the brakes of a motor vehicle, comprising four carriages placed in line by pairs, each having a surface with a coefficient of friction with the vehicle wheel at least equal to that of the average road-bed, said carriages supporting the four wheels of a motor vehicle, rollers on said carriages, said rollers resting on stationary, inclined, curvilinear surfaces, means for guiding the vehicle in moving it onto and from said carriages, means for applying a continuous tractive force on said vehicle, an indicator board including a casing, movable indexes guided in said casing, means for connecting said indexes to the respective carriages, springs acting upon said indexes to move the same upon movement of said carriages along their respective inclined surfaces and thereby indicate the position of the carriages on said curvilinear surface.

7. An apparatus for testing the wheel brakes of a motor vehicle comprising a movable carriage for each vehicle wheel, a surface on each carriage having a coefficient of friction with the vehicle wheel at least equal to that of the average road-bed, means for guiding the vehicle wheels onto and from their respective carriages, rollers on said carriages, said rollers movable on stationary, inclined, curvilinear surfaces, a cylinder provided with a piston movable under air pressure, means for operatively connecting the piston to said vehicle, an indicator casing, movable indicator indexes guided in said casing, means for connecting said indexes to the respective carriages, said indexes being adapted to indicate the position of said carriages with respect to said curvilinear surfaces.

8. Apparatus for testing vehicle brakes by determining the value of the ratio between the tangential brake force at the rim and the weight supported by the wheel, which comprises a movable carriage supporting each wheel, an inclined curvilinear pathway for each carriage, means to exert a traction on the axle of the braked wheel, and means for registering the slope of the curvilinear pathway at the point where said carriage stops when it is in equilibrium under the action of the tractive force exerted on the axle of the braked wheel and of the weight of this wheel.

9. Apparatus for testing motor vehicle brakes for successive brakeage values, which comprises inclined curvilinear pathways, carriages for supporting the wheels, these carriages being movable on said pathways, means for pulling the braked vehicle, and means for determining the trigonometric tangent of the angle made by the horizontal with a line drawn tangentially to each rolling pathway at the stopping point of the carriage when the latter is in equilibrium under the action of a tractive force exerted on the braked wheel and of the weight of this wheel.

10. Apparatus for testing motor vehicle brakes for successive brakeage values, which comprises inclined curvilinear pathways, carriages for supporting the vehicle wheels, these carriages resting on said pathways, counterweights for raising said carriages to the top of these pathways, means for retaining them in this position, means for fastening the braked vehicle when the carriages are at the top of the rolling pathways, means for freeing the carriages, and means for determining the trigonometric tangent of the angle made with the horizontal by a line drawn tangentially to each curvilinear pathway at the stopping point of the corresponding carriage on this pathway when the carriages have been freed.

EMILE PIQUEREZ.